US012676857B2

(12) United States Patent (10) Patent No.: US 12,676,857 B2

Sagnes et al. (45) Date of Patent: Jul. 7, 2026

(54) METHOD FOR PROVISIONING A SECURE ELEMENT WITH A PROFILE

(71) Applicant: THALES DIS FRANCE SAS, Meudon (FR)

(72) Inventors: Pierre Sagnes, La Ciotat (FR); Marc Lamberton, Antibes (FR); Gerald Glinka-Hecquet, Ceyreste (FR)

(73) Assignee: THALES DIS FRANCE SAS, Meudon (FR)

( * ) Notice: Subject to any disclaimer, the term of this patent is extended or adjusted under 35 U.S.C. 154(b) by 27 days.

(21) Appl. No.: 18/717,434

(22) PCT Filed: Nov. 30, 2022

(86) PCT No.: PCT/EP2022/083773

§ 371 (c)(1),
(2) Date: Jun. 7, 2024

(87) PCT Pub. No.: WO2023/110399

PCT Pub. Date: Jun. 22, 2023

(65) Prior Publication Data

US 2025/0047670 A1 Feb. 6, 2025

(30) Foreign Application Priority Data

Dec. 14, 2021 (EP) ..................................... 21306768

(51) Int. Cl.
*H04L 9/40* (2022.01)
(52) U.S. Cl.
CPC ................................. *H04L 63/0876* (2013.01)

(58) Field of Classification Search
CPC .. H04L 63/0876; H04W 8/205; H04W 8/183; H04W 12/06; H04W 12/42; H04W 12/45; H04W 12/009; H04W 4/70
See application file for complete search history.

(56) References Cited

U.S. PATENT DOCUMENTS

| 2016/0198378 A1* | 7/2016 | Huber | ................... H04W 8/265 |
| | | | 370/331 |
| 2021/0067931 A1 | 3/2021 | Lankalapalli et al. | |
| 2023/0189001 A1* | 6/2023 | Dees | ..................... H04W 8/205 |
| | | | 455/411 |

OTHER PUBLICATIONS

International Search Report (PCT/ISA/210) and Written Opinion (PCT/ISA/237) mailed on Jan. 16, 2023, by the European Patent Office as the International Searching Authority for current International Application No. PCT/EP2022/083773—[14 pages].

(Continued)

*Primary Examiner* — Khoi V Le

(57) ABSTRACT

Method for provisioning a secure element with a profile, said secure element cooperating with a M2M terminal and being connected to the network of a first MNO thanks to a first profile, including requesting by a M2M service provider a second profile to the network of a second MNO; provisioning by said second MNO said second profile in the network of said second MNO; sending from said network to a subscription manager an order to download said second profile; terminating said first profile to the network of said first MNO; barring by said first MNO said subscription in the network of said first MNO; performing by said secure element a Fall-Back procedure; attaching said secure element to a provisioning HLR by using said provisioning profile; downloading from said subscription manager to said secure element said second profile; and enabling said second profile to become an operational profile.

2 Claims, 1 Drawing Sheet

(56)               References Cited

OTHER PUBLICATIONS

GSM Association: "Official Document SGP.01—Embedded SIM Remote Provisioning ArchitectureEmbedded SIM Remote Provisioning Architecture Version 4.2", GSM Association, GSM Association, GSMA Floor2 the Walbrook Building 25 Wallbrook London, UK, Jul. 9, 2020 (Jul. 9, 2020), XP040720653, cited in the application paragraphs [01.5], [3.3.1.3.7], [3.3.1.5], [3.5.13].
GSMA: GSM Association Non-confidential Official Document SGP.02-SGP.02 Remote Provisioning Architecture for Embedded UICC Technical Specification Version 4.2.1 T, Nov. 26, 2021 (Nov. 26, 2021), GSMA Industry Specification, GSM Association, pp. 1-447, XP009535699, cited in the application, paragraph [3.16].

* cited by examiner

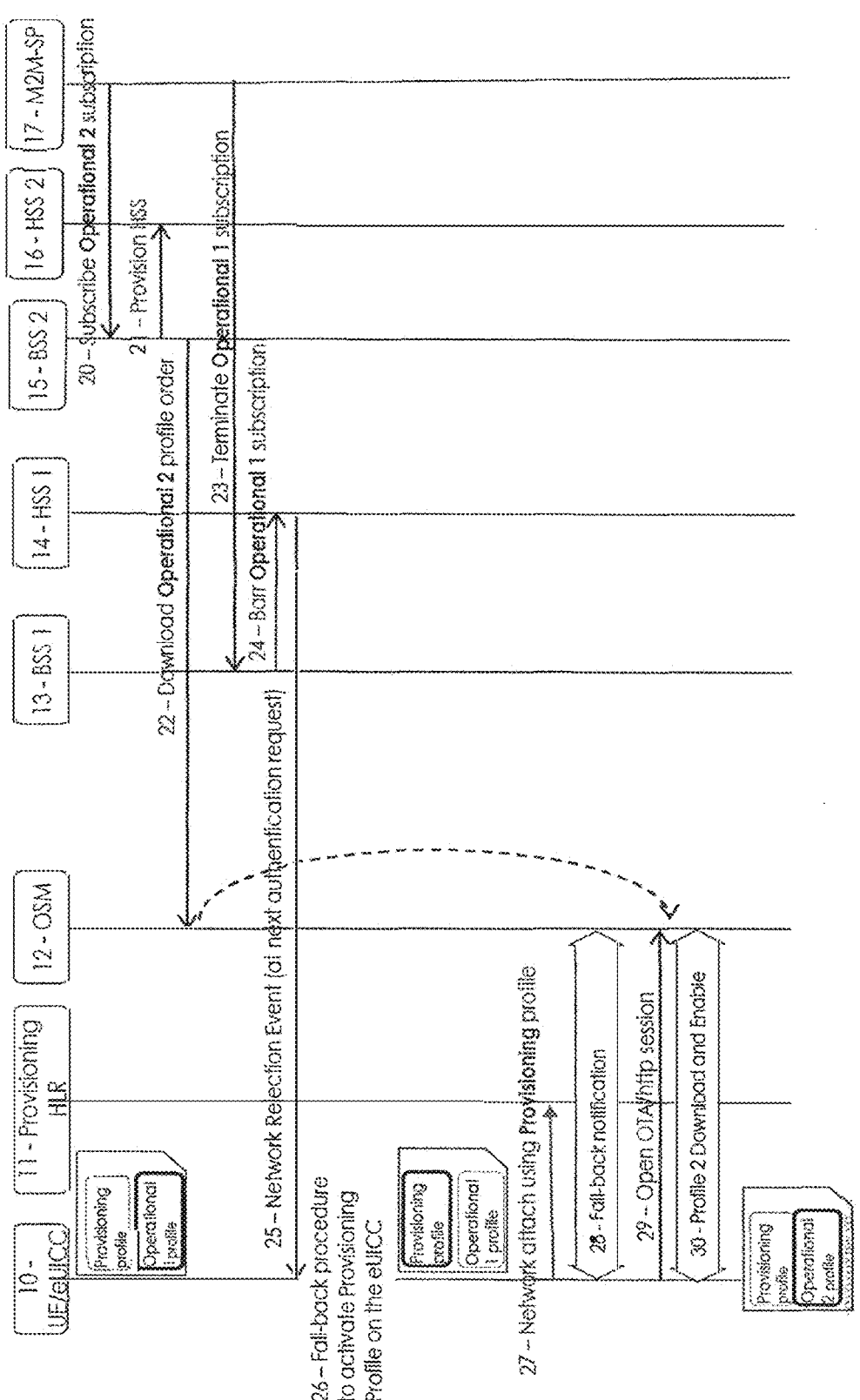

METHOD FOR PROVISIONING A SECURE ELEMENT WITH A PROFILE

FIELD OF USE

The present invention concerns telecommunications and more precisely a method for provisioning a secure element with a profile, this secure element cooperating with a terminal, for example a M2M terminal, an IoT device or a smartphone.

BACKGROUND

A profile contains a subscription permitting to the secure element to attach to the network of a MNO (Mobile Network Operator).

The secure element can be a chip card, a SIM card, a UICC, a eUICC (embedded UICC) or an iUICC (integrated UICC). Such a secure element can be provisioned Over The Air (OTA) by a distant server.

Remote Provisioning of eUICC is defined by GSMA using two technical specifications: SGP.02 for M2M and SGP.22 Consumer. A third technical specification is under definition to address M2M and Consumer IoT use-cases. The objective is to download and activate a MNO subscription, at the first terminal use (first power on) or during the device life-cycle.

In the Consumer solution, there is a subscriber using the consumer device who is able to trigger Remote Provisioning action.

In the M2M and Consumer IoT use-cases, there is a need to have a mechanism to remotely trigger such provisioning, since the device may not be easily reachable, or is managed by a M2M Service Provider that needs to be in control.

The GSMA M2M solution relies on SMS channel to send a command to the secure element (eUICC) to initiate remote provisioning action.

Another possibility is to use a polling mechanism on eUICC side to regularly check with a Subscription Manager if there is a remote provisioning action to perform. Polling mechanism is considered as too heavy and not efficient for M2M and especially for (Low-Power) IoT use-cases.

SUMMARY

The present invention aims to replace the SMS push mechanism, by a signaling mechanism that will inform eUICC to perform such polling request to Subscription Manager.

This is especially important for one low power cellular technology: NB-IoT. As reported by GSMA, operators deploying NB-IoT usually do not support SMS and SMS roaming. Therefore, it is necessary to find an alternative to what is specified in SGP.02 which is not compatible with most NB-IoT available services.

The invention concerns:

a way to remotely provision post-issuance a MNO subscription in an eUICC when SMS channel is not available to wake-up the eUICC, and without using any cyclic polling mechanism;

M2M and Consumer IoT use-cases, using Low-Power networks but also any 3GPP network.

These objectives and others that will appear thereafter are reached thanks to a method for provisioning a secure element with a profile, called second profile, the secure element cooperating with a M2M terminal and being connected to the network of a first MNO thanks to a first profile, the method comprising:

A—Requesting by a M2M service provider a profile, called second profile, to the network of a second MNO;

B—Provisioning by the second MNO the second profile in the network of the second MNO;

C—Sending from the network of the second MNO to a subscription manager an order to download the second profile;

D—Terminating by the M2M service provider the first profile to the network of the first MNO;

E—Barring by the first MNO the subscription in the network of the first MNO;

F—Performing by the secure element, by receiving a network rejection event from the network of the first MNO, a Fall-Back procedure as defined by GSMA specification SGP.01 v4.2 Fall-Back Mechanism/ SGP.02 v4.2.1 Fall-Back Activation Procedure for activating a provisioning profile and deactivating the first profile on the eUICC;

G—Attaching the secure element to a provisioning HLR by using the provisioning profile, the provisioning HLR cooperating with the subscription manager;

H—After having opened an OTA/http session with the subscription manager, downloading from the subscription manager to the secure element the second profile and enabling the second profile become an operational profile.

Step-H—also preferably comprises deleting the first profile in the secure element.

BRIEF DESCRIPTION OF THE DRAWINGS

More features and advantages of the invention will appear by reading the description of the unique FIGURE:

FIG. 1 is a diagram showing an example of exchanges between different entities.

DETAILED DESCRIPTION

The unique FIGURE is a diagram showing an example of exchanges between different entities.

These entities are:

A UE (User Equipment) cooperating with a secure element like an eUICC 10—the UE/eUICC 10 is provisioned with a provisioning profile (bootstrap permitting the UE/eUICC 10 to connect to an On-demand Subscription Manager (OSM) 12) and an operational profile, noted Operational 1 profile;

A provisioning HLR 11;

The OSM 12 (On-demand Subscription Manager) constituted by a SM-SR (Subscription Manager Secure Routing);

A BBS1 13 and a HSS1 14 belonging to a first network operator (MNO);

A BBS2 15 and a HSS2 16 belonging to a second network operator;

A M2M-SP (Machine to Machine-Service Provider) 17—the M2M-SP 17 manages the UE/eUICC 10.

At the beginning, the UE/eUICC 10 is considered to be connected to the network of the first network operator with its Operational 1 profile.

The aim of the disclosed method is to provision the secure element with a profile, called second profile, the secure element cooperating with a M2M terminal (UE) and being connected to the network of a first MNO thanks to a first profile.

The flow of signals exchanged between these different entities is, in a simplified form, the following:

At step 20, the M2M-SP 17 decides that the Operational 1 profile has to be switched to another operational profile because, for example, the Operational 1 profile is not convenient anymore (bad QoS, connectivity has been lost between the first network operator and the UE/eUICC 10, . . . ) and that Operational 1 profile has to be replaced by another operational profile, noted Operational 2 profile. The M2M-SP 17 thus sends an instruction to the BSS2 15 in order to subscribe to an Operational 2 subscription. This request corresponds to a request of a profile (Operational 2 profile), a profile comprising a subscription.

At step 21, the BSS2 15 provisions the HSS2 16 with the Operational 2 subscription (profile).

At step 22, the BSS2 15 sends to the OSM 12 an order to download the Operational 2 profile in the UE/eUICC 10.

At step 23, the M2M-SP 17 sends to the BSS1 13 an order to terminate the Operational 1 subscription and, at step 24, the BSS1 13 informs the HSS1 14 that it has to bar the Operational 1 subscription (profile). Operational 1 subscription becomes therefore no more available. The first profile (Operational 1 profile) is thus terminated by the M2M-SP 17.

Then, at step 25, after an authentication request performed by the HSS1 14, this HSS1 14 sends to the UE/eUICC 10 a network rejection event (since the Operational 1 subscription is unavailable).

The UE/eUICC 10 then performs a Fall-Back procedure like defined by GSMA specification SGP.01 v4.2 Fall-Back Mechanism/SGP.02 v4.2.1 Fall-Back Activation Procedure.

In these specifications, it is precised that, in the event of loss of network connectivity, as detected by the UE, there is a need to change to the profile with Fall-Back attribute set. In this case the eUICC disables the currently Enabled Profile (here Operational 1 profile) and enables the profile with Fall-Back Attribute set (Provisioning profile).

This operation activates the provisioning profile of the secure element and desactivates the Operational 1 profile. The operational profile is then the provisioning profile, used by the eUICC for its very first connexion (after its first power on).

So, during this step, the secure element, by receiving a network rejection event from the network of the first MNO, enters in a Fall-Back procedure as defined by GSMA specification SGP.01 v4.2 Fall-Back Mechanism/SGP.02 v4.2.1 Fall-Back Activation Procedure for activating a provisioning profile and desactivating the first profile.

At step 27, the UE/eUICC 10 tries to attach to the provisioning HLR 11 by using the provisioning profile. The provisioning HLR 11 cooperates with the subscription manager OSM 12).

At step 28, the UE/eUICC 10 and the OSM 12 exchange messages to notify that the UE/eUICC 10 has entered in the Fall-Back operation mode.

The UE/eUICC 10 then, at step 29, opens an OTA/http session with the OSM 12 in order to download profile 2. The OSM 12 then downloads (if not already done after step 22) the profile 2 from BSS2 15 (as shown by the dotted arrow) and, at step 30, downloads and enables profile 2 in the secure element.

As shown in the FIGURE, the operational profile is then operational profile 2. Profile 1 is preferably then deleted by the OSM 12.

The UE/eUICC 10 is now able to communicate with the network of the second MNO (BSS2 15) thanks to the second profile.

In summary, when Remote Subscription Provisioning (RSP) is needed, the existing 3GPP signalling channel (network rejection) and existing "Fall-Back procedure" defined in GSMA M2M technical specification are used to activate a specific "provisioning profile" in the secure element that will be in charge of initiating a Remote Provisioning session between the secure element and the M2M Subscription Manager 12.

The present invention is based on two main features:

The use of the Fall-Back procedure as defined by the GSMA to trigger the Remote Subscription Provisioning sequence, by barring the existing subscription in the HSS1 14 to generate a "Network Rejection Event" at next device authentication, so that the "provisioning profile" will become activated and perform the next subscription profile download;

EP-3.577.921 B1 of the same applicant that describes a method for an eUICC embedded into a machine type communication device to trigger the download of a subscription profile from a first network operator, MNO1, the eUICC being provisioned with an eUICC identifier, EID, and a pre-loaded data set memorizing a range of IMSIs associated to a second network operator, MNO2, the method comprising the steps of:

selecting randomly by the eUICC an IMSI number in the range memorized in the pre-loaded data set;

sending an attachment request comprising the randomly selected IMSI, R-IMSI, for it to be received by a discovery server associated to the second network operator, MNO2, the discovery server being adapted to generate a request for getting the eUICC identifier, EID;

receiving in an authentication request message the request for getting the eUICC identifier, EID;

as a response, sending to the discovery server a authentication failure message comprising an indication of a synchronisation failure and the eUICC identifier, EID, so that the discovery server is able to identify the first network operator, MNO1, as a provider of a subscription profile for this eUICC;

receiving in an authentication request message a temporary IMSI, t-IMSI, from the discovery server so that the machine type communication device is able to attach to the first network operator, MNO1, and download the pending subscription profile, said temporary IMSI, t-IMSI, belonging to the first network operator and being allocated temporarily to the eUICC for enabling the download of the subscription profile.

More information can also be found in EP-3.577.922 B1 to which the present invention is linked. The invention permits to execute a Remote Provisioning action in secure elements like eUICCs without using any cyclic polling mechanism, and when no "push" communication channel is available (SMS-less network).

The invention claimed is:

1. A method for provisioning an embedded Universal Integrated Circuit Card (eUICC) of a User Equipment (UE), with a profile, called second profile, said eUICC cooperating and communicatively coupled with a Machine to Machine (M2M), terminal and connected to a network of a first Mobile Network Operator (MMO), with a first profile, said method comprising the steps of:

requesting, by a M2M service provider, a profile, called second profile, to the network of a second MNO;

provisioning, by said second MNO, said second profile in its network;

sending from said network of said second MNO to a subscription manager an order to download said second profile;

terminating by said M2M service provider, said first profile, to the network of said first MNO;

barring by said first MNO said first profile in its network;

receiving, by said eUICC, a network rejection event from said network of said first MNO, in accordance with a Fall-Back procedure as defined by GSMA specification SGP.01 v4.2 Fall-Back Mechanism/SGP.02 v4.2.1 Fall-Back Activation Procedure for activating a provisioning profile on said eUICC and disactivating said first profile on said eUICC, thereby replacing a SMS push mechanism by a signaling mechanism that informs the eUICC to perform a polling request to the Subscription Manager as a remote provisioning action;

attaching said eUICC to a provisioning Home Location Register (HLR), according to said provisioning profile, said provisioning HLR communicatively coupled and cooperating with said subscription manager to perform said remote provisioning action; and after opening an OTA/http session with said subscription manager, downloading from said subscription manager to said eUICC said second profile, and enabling said second profile, as an operational profile for operators deploying NB-IoT that do not support SMS and SMS roaming, thereby providing an alternative to what is specified in SGP.02 which is not compatible with most NB-IoT available services.

2. The method according to claim 1 wherein the step-H—of opening an OTA/http session also comprises deleting said first profile, in said UICC.

* * * * *